United States Patent
Melnyk

(10) Patent No.: US 12,338,321 B2
(45) Date of Patent: Jun. 24, 2025

(54) MEDIUM OR HIGH MOLECULAR WEIGHT POLYESTER POWDERS, POWDER COATING COMPOSITIONS, AND PROCESSES OF MAKING POWDERS

(71) Applicant: SWIMC LLC, Cleveland, OH (US)

(72) Inventor: Tom Melnyk, Greenfield, MN (US)

(73) Assignee: SWIMC LLC, Cleveland, OH (US)

( * ) Notice: Subject to any disclaimer, the term of this patent is extended or adjusted under 35 U.S.C. 154(b) by 825 days.

(21) Appl. No.: 17/270,794

(22) PCT Filed: Aug. 15, 2019

(86) PCT No.: PCT/US2019/046651
§ 371 (c)(1),
(2) Date: Feb. 23, 2021

(87) PCT Pub. No.: WO2020/046593
PCT Pub. Date: Mar. 5, 2020

(65) Prior Publication Data
US 2021/0261729 A1 Aug. 26, 2021

Related U.S. Application Data

(60) Provisional application No. 62/724,222, filed on Aug. 29, 2018.

(51) Int. Cl.
*C08G 63/90* (2006.01)
*C08G 63/81* (2006.01)
*C08G 63/89* (2006.01)
*C09D 167/02* (2006.01)

(52) U.S. Cl.
CPC ............. *C08G 63/90* (2013.01); *C08G 63/81* (2013.01); *C08G 63/89* (2013.01); *C09D 167/02* (2013.01)

(58) Field of Classification Search
CPC ................................. C08G 63/90; C08G 63/81
See application file for complete search history.

(56) References Cited

U.S. PATENT DOCUMENTS

| | | |
|---|---|---|
| 3,056,818 A | 10/1962 | Werber |
| 3,326,965 A | 6/1967 | Heinz et al. |
| 4,554,343 A | 11/1985 | Jackson, Jr. et al. |
| 5,739,213 A | 4/1998 | Freriks et al. |
| 5,981,690 A | 11/1999 | Lustig et al. |
| 6,043,335 A | 3/2000 | Banach et al. |
| 6,184,311 B1 | 2/2001 | Okeefe et al. |
| 6,281,325 B1 | 8/2001 | Kurian et al. |
| 6,887,953 B2 | 5/2005 | Eng |
| 9,624,342 B2 | 4/2017 | Brandenburger et al. |

FOREIGN PATENT DOCUMENTS

| | | |
|---|---|---|
| CN | 1358809 | 7/2002 |
| CN | 101939031 | 1/2011 |

OTHER PUBLICATIONS

International Patent Application No. PCT/US2019/046651 filed Aug. 15, 2019, International Preliminary Report on Patentability, issued Mar. 2, 2021, 7 pgs.
International Patent Application No. PCT/US2019/046651 filed Aug. 15, 2019, International Search Report and Written Opinion issued Nov. 25, 2019, 13 pgs.
International Standard ASTM D522/D522M-17 "Standard Test Methods for Mandrel Bend Test for Attached Organic Coatings," Jul. 1, 2017, ASTM International, West Conshohocken, Pennsylvania, 5 pages.
International Standard ASTM D523-14 (Reapproved 2018) "Standard Test Method for Specular Gloss," May 1, 2018, ASTM International, West Conshohocken, Pennsylvania 5 pages.
International Standard ASTM D2794-93 (Reapproved 2019) "Standard Test Method for Resistance of Organic Coatings to the Effects of Rapid Deformation (Impact)," Jan. 1, 2019, ASTM International, West Conshohocken, Pennsylvania, 3 pages.
International Standard ASTM D4217-07 (Reapproved 2017) "Standard Test Method for Gel Time of Thermosetting Coating Powders," Jun. 1, 2017, ASTM International, West Conshohocken, Pennsylvania, 2 pages.
International Standard ASTM D4752-20 "Standard Practice for Measuring MEK Resistance of Ethyl Silicate (Inorganic) Zinc-Rich Primers by Solvent Rub," Feb. 1, 2020, ASTM International, West Conshohocken, Pennsylvania, 8 pages.
Ullmann's Polymers and Plastics, 4 Volume Set: Products and Processes, vol. 2, p. 794 (Whaley-VCH) Mar. 18, 2016, ISBN: 978-3-527-33823-8. Title page, copyright page, table of contents, p. 794 section page.
Ullman's Polymers and Plastics: Products and Processes, 4 Volume Set, vol. 2, Wiley-VCH, Mar. 18, 2016, ISBN: 978-3-527-33823-8. Title page, copyright page, table of contents, pp. 791-816.
Extended European Search Report issued Apr. 25, 2022 for EP Patent Application No. 19855162.4, 6 pages.

*Primary Examiner* — Wenwen Cai
(74) *Attorney, Agent, or Firm* — Mueting Raasch Group

(57) ABSTRACT

A process of providing a medium or high molecular weight polyester powder, the resultant polyester polymer powder, and a powder coating composition that includes such powder; wherein the process includes: providing or forming an ester oligomer; converting the oligomer to a polyester polymer by stirring at elevated pressure and elevated temperature a reaction mixture that includes the oligomer and a nonreactive carrier capable of forming an azeotrope with water and xylenes; removing water from the reaction mixture via azeotropic reflux to provide a syrup including a medium or high molecular weight polyester polymer in the nonreactive carrier; and applying a vacuum to remove the xylenes from the syrup and form a solid (which may be in the form of a powder or subsequently formed into a powder) that includes the medium or high molecular weight polyester polymer.

18 Claims, No Drawings

MEDIUM OR HIGH MOLECULAR WEIGHT POLYESTER POWDERS, POWDER COATING COMPOSITIONS, AND PROCESSES OF MAKING POWDERS

This application is the § 371 U.S. National Stage of International Application No. PCT/US2019/046651, filed 15 Aug. 2019, which claims the benefit of U.S. Provisional Application No. 62/724,222, filed 29 Aug. 2018, the disclosures of which are incorporated by reference herein in their entireties.

BACKGROUND

Linear polyesters typically are prepared from oligomers made by reacting together one or more dicarboxylic acids and one or more diols via direct esterification, by reacting together one or more dimethyl esters and one or more diols via transesterification, or by carrying out both direct esterification and transesterification in a single reaction mixture. Water evolves from the reaction mixture in the case of direct esterification, and methanol evolves from the reaction mixture in the case of transesterification. The resulting oligomers may be converted to higher molecular weight polyester polymers via polycondensation. Branched polyesters may be made by introducing tri- or higher-functional reactants in place of some of the dicarboxylic acids, diols, or dimethyl esters.

Low molecular weight polyesters normally are prepared in a single stage reaction that accomplishes both direct esterification and polycondensation. The reaction typically is carried out at atmospheric pressure and at temperatures near the normal boiling point for the diol (e.g., at temperatures of 170-210° C. for reactions using ethylene glycol). A large diol excess normally is employed. A small quantity (e.g., 3%) of xylenes may be added near the end of the reaction to assist in distilling water from the reaction mixture. The end product is a low molecular weight polyester, which after cooling to room temperature, may be a liquid or in some cases an amorphous solid.

Medium and high molecular weight polyesters typically are made via a two-stage process. The first stage typically is a direct esterification or transesterification reaction to form a liquid low molecular weight oligomer and the second stage typically is a polycondensation reaction to convert the oligomer to a polymer with a targeted molecular weight. Considerable time may be required to complete the two stages. The first stage esterification reaction may, for example, be carried out using conditions similar to the low molecular weight polyester direct esterification reaction conditions described above. The second stage polycondensation reaction typically is performed using melt or solid-state polymerization, together with vacuum (e.g., 0.1-1 mm Hg pressure) and high temperature (e.g., temperatures above ambient temperature such as 270-290° C. for polyesters derived from ethylene glycol). The vacuum and heat aid in removal of the excess diol. The reaction mixture typically has sufficiently high viscosity so that it would be unduly difficult to stir it during the polycondensation reaction. The end product is a medium or high molecular weight polyester, which after cooling, is a solid. The solid product typically is pelletized prior to shipment to an end user. The end user may in turn melt the pellets using an extruder or other suitable device and form the melt into a film or mold it into solid objects. For example, containers (e.g., bottles in the case of polyethylene terephthalate resins) represent a very high volume use for pelletized polyester resins.

SUMMARY OF THE DISCLOSURE

The present disclosure provides a process for preparing a medium or high molecular weight polyester powder, the resultant powder, and a powder coating composition that includes such powder.

In one embodiment, the process includes: providing or forming an ester oligomer; converting the oligomer to a polyester polymer by stirring at elevated pressure and elevated temperature a reaction mixture that includes the oligomer and a nonreactive carrier capable of forming an azeotrope with water and an aromatic solvent (e.g., xylenes, toluene, aromatic 100, aromatic 150); removing water from the reaction mixture via azeotropic reflux to provide a syrup including a medium or high molecular weight polyester polymer in the nonreactive carrier; and applying a vacuum to remove the aromatic solvent from the syrup and form a solid (which may be in the form of a powder or subsequently formed into a powder) that includes the medium or high molecular weight polyester polymer.

In another embodiment, a polyester polymer powder formed by a process described herein is provided.

In yet another embodiment, a powder coating composition that includes such polyester polymer powder and one or more additives is provided.

The term "azeotrope" means a mixture of two or more pure compounds which form a constant boiling point mixture.

The term "elevated temperature" means a temperature of at least 120° C.

The term "elevated pressure" means a pressure of above atmospheric pressure.

The term "esterification" refers to direct esterification or transesterification.

When used with respect to a polymer, the term "low molecular weight" means a polymer whose Mn is less than 4,000 amu, "medium molecular weight" means a polymer whose Mn is 4,000 up to 7,000 amu, and "high molecular weight" means a polymer whose Mn is greater than 7,000 amu.

The term "nonreactive carrier" means a solvent or other carrier which can dissolve, disperse, or otherwise solubilize a medium or high molecular weight polyester to form the disclosed polyester syrup, which is not a reactant (e.g., not a glycol) from which the polyester is formed, and which will not react with the polyester (e.g., will not transesterify with the polyester) at polycondensation temperatures.

The term "non-viscometric technique" means a method for monitoring the progress of a polymer-forming reaction without requiring a viscosity measurement.

The term "polycondensation temperatures" means temperatures of at least 200° C.

The term "polyester" refers to linear and branched polyesters.

The term "polyester syrup" means a liquid (intermediate product) which is readily pourable at room temperature and which contains a medium molecular weight or high molecular weight polyester polymer in a nonreactive carrier.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

When used with respect to a component that may be found in a mixture, the term "substantially free of" means containing less than 5 wt-% of the component based on the mixture weight.

Xylene (i.e., xylol or dimethylbenzene) is any one of three isomers of dimethylbenzene. As a solvent, it is typically a mixture of such isomers and referred to as xylenes. Herein, the terms xylene and xylenes are used interchangeably.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides a process for preparing medium or high molecular weight polyester polymer powders, the resultant polyester polymer powders, and powder coating compositions that include such polyester powders.

In one embodiment the process of providing a medium or high molecular weight polyester powder is provided that includes: providing or forming an ester oligomer; converting the oligomer to a polyester polymer by stirring at elevated pressure and elevated temperature a reaction mixture that includes the oligomer and a nonreactive carrier capable of forming an azeotrope with water and an aromatic solvent (e.g., xylenes, toluene, aromatic 100, aromatic 150); and removing water from the reaction mixture via azeotropic reflux to provide a syrup including a medium or high molecular weight polyester polymer in the nonreactive carrier; and applying a vacuum to remove the aromatic solvent from the syrup and form a solid (which may be in the form of a powder or subsequently formed into a powder) that includes the medium or high molecular weight polyester polymer.

The steps of this process that form the syrup are disclosed in U.S. Pat. No. 9,624,342 (Brandenburger et al.). In sum, this describes a process in which a two-stage reaction is performed. The process uses an apparatus (as shown in FIG. 1 of U.S. Pat. No. 9,624,342) that includes an esterification reactor for forming an ester oligomer by direct esterification or transesterification. The esterification reactor is equipped with an impeller mounted on a shaft and driven by a motor. A fractional distillation column enables removal of water through an outlet. An inert gas supply is regulated and fed to the reactor. A carboxylic acid reactant (typically in solid form) may be melted using an extruder and fed to the reactor. The extruder may be omitted for reactants (e.g., isophthalic or terephthalic acid) that may be degraded in an extruder and which may simply be added in solid form to the esterification reactor. The extruder may also be omitted for reactants (e.g., phthalic anhydride) whose melting behavior is such that they may be melted in the vessel and fed directly to the reactor. A glycol reactant (usually in liquid form) is regulated and fed to the esterification reactor. A catalyst solution is regulated and fed to the esterification reactor. At the completion of the esterification reaction, an oligomer or low molecular weight polyester product is removed from the esterification reactor and fed to a polycondensation reactor.

The polycondensation reactor is a pressurizable vessel equipped with an impeller mounted on shaft and driven by motor. A reflux distillation column removes reaction byproducts and evaporated nonreactive carrier from the polycondensation reactor and passes them to a condenser. A condensed nonreactive carrier is collected in the bottom of the condenser, reaction byproducts are removed, and condensed nonreactive carrier is returned to the column. The polycondensation reaction is performed under pressure and its progress may be monitored in a variety of ways using known techniques. When the polycondensation reaction is judged to be complete, the polycondensation reaction product syrup is removed from the polycondensation reactor.

The esterification and polycondensation reactions described in U.S. Pat. No. 9,624,342 outlined above may be referred to as first and second stages, respectively, involving oligomerization and polymer formation. It will be appreciated by persons having ordinary skill in the art that the dividing line between oligomerization and polymerization may be somewhat hard to draw, and that some polymer formation may take place in the esterification reactor and some oligomerization may take place in the polycondensation reactor. Such reactions may also be performed in a single pressurizable reactor, which is described in FIG. 2 in U.S. Pat. No. 9,624,342.

A variety of dicarboxylic acids or their anhydrides or esters may be used in the formation of an ester oligomer. Representative dicarboxylic acids for use in direct esterification reactions include, but are not limited to, saturated carboxylic acids, unsaturated carboxylic acids, their anhydrides, and combinations thereof, and the eventual polyester may be a saturated or unsaturated polyester. The dicarboxylic acids may be aromatic, aliphatic, or cycloaliphatic. Exemplary dicarboxylic acids include, but are not limited to, maleic acid, chloromaleic acid, famaric acid, itaconic acid, citraconic acid, mesaconic acid, malic acid, succinic acid, glutaric acid, d-methylglutaric acid, adipic acid, sebacic acid, pimelic acid, o-phthalic acid, isophthalic acid (IPA), terephthalic acid (TPA), dihydrophthalic acid, tetrahydrophthalic acid, hexahydrophthalic acid, tetrachlorophthalic acid, chlorendic acid, dodecanedicarboxylic acid, cis-5-norbornene-2,3-dicarboxylic acid, 2,6-naphthalene dicarboxylic acid, dimethyl-2,6-naphthenic dicarboxylic acid, 1,4-cyclohexane dicarboxylic acid, and their anhydrides. Preferred dicarboxylic acids include terephthalic acid, isophthalic acid, o-phthalic acid, glutaric acid, adipic acid, 1,4-cyclohexane dicarboxylic acid, 2,6-naphthalene dicarboxylic acid, hexahydrophthalic acid, adipic acid, and their anhydrides and esters. Esters (e.g., methyl esters) of any of the above dicarboxylic acids may be employed in transesterification reactions. The reaction mixture may, if desired, contain minor amounts of monocarboxylic acids or esters or minor amounts of tri- or higher carboxylic acids or esters, including but not limited to, for example, ethylhexanoic acid, propionic acid, trimellitic acid, benzoic acid, 4-methylbenzoic acid, 1,2,4-benzenetricarboxylic acid, 1,2,4,5-benzenetetracarboxylic acid, and their anhydrides or esters.

A variety of glycols may be used in the formation of an ester oligomer. Representative glycols for use in direct esterification reactions include, but are not limited to, linear, cyclic, and branched aliphatic diols having 2 or more (e.g., 2 to 8) carbon atoms; aliphatic and aromatic ether glycols having 4 or more (e.g., 4 to 20, or 4 to 10) carbon atoms; and combinations thereof. Exemplary glycols include, but are not limited to, ethylene glycol (also referred to as EG, boiling point (B.P. 195° C. at atmospheric pressure), 1,2-propanediol (propylene glycol or PG, B.P. 188° C.), 1,3-propanediol (boiling point 214° C.), 2-methyl-1,3-propanediol (MPDiol, B.P. 212° C.), 2,2-dimethyl-1,3-propanediol (neopentyl glycol or NPG, B.P. 208° C.), 2,2,4-trimethyl-1,3-pentanediol (TMPD Glycol, initial B.P. 220° C.), 2-butyl-2-ethyl-1,3-propanediol (BEPG, B.P. 103-106° C.), 3-hydroxy-2,2-dimethylpropyl 3-hydroxy-2,2-dimethyl propanate, 1,3-butylene glycol (B.P. 204° C.), 1,4-butanediol (B.P. 230° C.), 3-methyl-1,5-pentanediol (MPD, B.P. 249° C.), 1,6-hexanediol (B.P. 250° C.), 1,2-cyclohexanediol (B.P. 118-120° C. at 10 mm Hg), 1,4-cyclohexanediol (B.P. 150° C. at 50 mm Hg), 1,4-bis(hydroxymethyl)cyclohexane (cyclohexanedimethanol or CHDM, B.P. 283° C.), 2,2-dimethyl heptanediol, 2,2-dimethyl octanediol, diethylene glycol (DEG, B.P. 245° C.), triethylene glycol (TEG, B.P. 285° C.), dipropylene glycol (B.P. 229-232° C.), tripropylene glycol (B.P. 273° C.), polyethylene glycol (PEG), hydroquinone bis(2-hydroxyethyl)ether, diethylene ether glycol (B.P. 197° C.), poly(ethylene ether) glycol, 2,2-bis-(p-hydroxycyclohexyl)-propane, 5-norbornene-2,2-dimethylol, and 2,3-norbornene diol. The reaction mixture may be prepared without or substantially without the use of EG or PG and instead prepared using higher boiling point glycol(s) which in conventional polyester polymer syntheses might normally not be employed alone. For example, the reaction mixture may be prepared using only glycols having atmospheric pressure boiling points of at least 196° C., at least 200° C., at least 204° C., or at least 208° C. This may enable the synthesis of novel polyester polymers having especially desirable physical properties (e.g., altered crystallinity, glass transition temperature, softening point or melt flow rate) not available or not readily available in polyester polymers derived from EG or PG. Preferred glycols include 2-methyl-1,3-propanediol, 2,2-dimethyl-1,3-propanediol, 1,3-butylene glycol, 1,4-butanediol and 1,6-hexanediol. The reaction mixture may, if desired, contain minor amounts of monofunctional alcohols or minor amounts of tri- or higher-functional alcohols, including, but not limited to, 2-ethylhexyl alcohol, 2-cyclohexyl ethanol, 2,2-dimethyl-1-propanol, lauryl alcohol, benzyl alcohol, cyclohexanol, glycerol, trimethylol propane, trimethylol ethane, di-trimethylol propane, pentaerythritol, dipentaerythritol, and tripentaerythritol.

A variety of catalysts may be employed for esterification and will be familiar to persons having ordinary skill in the art. Exemplary catalysts include, but are not limited to, inorganic and organic compounds of titanium, tin, lanthanum, zinc, copper, magnesium, calcium, manganese, iron and cobalt, including oxides, carbonates and phosphorus compounds, alkyl compounds, aryl compounds and aryl derivatives, as well as combinations of two or more thereof. Representative catalysts include, but are not limited to, titanium catalysts (e.g., tetraisopropyl titanate and tetraisobutyl titanate); mixed titanium/zirconium catalysts; lanthanum acetylacetonate; cobalt acetate; organic titanium and organic zirconium compounds such as those disclosed in U.S. Pat. No. 3,056,818 (Werber), U.S. Pat. No. 3,326,965 (Heinz et al.), U.S. Pat. No. 5,981,690 (Lustig et al.), and U.S. Pat. No. 6,043,335 (Banach et al.); and tin catalysts including n-butylstannoic acid, octylstannoic acid and others as described in U.S. Pat. No. 6,281,325 (Kurian et al.) and U.S. Pat. No. 6,887,953 (Eng). The catalyst may be employed in an amount sufficient to promote the desired direct esterification or transesterification reaction, for example, 5 parts per million (ppm) to 10,000 ppm catalyst based on the polyester weight.

The functionality of the polyester polymer may be acid functional, hydroxyl functional, or a combination thereof. Preferably, the functionality of the polyester polymer is primarily acid functional (e.g., having an acid number of at least 17). In certain embodiments, the acid number of the polyester polymer is at least 18, at least 19, or at least 20. In certain embodiments, the acid number of the polyester polymer is up to 26. Ideally, target values of acid and hydroxyl numbers for the polyester polymer are an acid number of 20 to 26, and a hydroxyl number of 1 to 3. To increase the acid functionality of a polyester polymer that is primarily hydroxyl functional (e.g., having an acid number of less than 3), an anhydride (e.g., phthalic anhydride) may be used in a ring opening reaction. A temperature of this reaction is sufficient to ring open but not so high as to cause additional esterification. This temperature is typically from 130° C. to 170° C.

The hydroxyl:acid mole ratio for a direct esterification reaction (or the hydroxyl:ester ratio for a transesterification reaction) may be, for example, at least 0.5:1, at least 0.8:1, at least 0.9:1, at least 0.95:1, at least 0.98:1, or at least 1:1. The hydroxyl:acid mole ratio for a direct esterification reaction (or the hydroxyl:ester ratio for a transesterification reaction) may be, for example, up to 2:1, up to 1.5:1, up to 1.2:1, up to 1.1:1, up to 1.05:1, or up to 1.02:1.

Herein, for acid functional polymers, the hydroxyl:acid mole ratio for a direct esterification reaction (or the hydroxyl:ester ratio for a transesterification reaction) may be, for example, at least 0.908:1 and up to 0.967:1.

Herein, for hydroxyl functional polymers, the hydroxyl:acid mole ratio for a direct esterification reaction (or the hydroxyl:ester ratio for a transesterification reaction) may be, for example, at least 1.1:1 and up to 1.033:1.

The desired ratio may be well below the ratios normally used for direct esterification where a substantial excess of glycol typically is employed. The disclosed process thus permits a reduction in the amount of glycol employed at the start of the esterification reaction, and permits the reaction to be performed using glycols with boiling points above the 196° C. boiling point of ethylene glycol. This may speed the reaction rate, alter the number of side reactions, or make it easier to attain a targeted number average molecular weight for the ester oligomer or for the final polyester. For example, approximately a 1.025:1 hydroxyl:acid ratio may provide an approximately 10,000 amu final polyester product, and approximately a 1.01:1 hydroxyl:acid ratio may provide an approximately 20,000 amu final polyester product. The end product number average molecular weight will increase sharply as the hydroxyl:acid or hydroxyl:ester mole ratio approaches 1:1, and thus careful monitoring of the ratio during the course of the esterification reaction will help avoid overshooting a targeted number average molecular weight.

The ester oligomer may be formed in an esterification step. In certain embodiments, the esterification occurs in a nonreactive carrier. In some embodiments, this esterification step occurs substantially without ethylene glycol or propylene glycol.

Esterification may be performed using a batch or continuous reaction process. Heating may be employed prior to feeding, during feeding, during mixing, or combinations thereof. The temperature may be held at a constant value or may be varied during the course of esterification. The reactants desirably are maintained at a temperature sufficient to promote rapid reaction and evolution of water, methanol or other byproducts while avoiding decomposition of the oligomer. The reaction mixture (of the converting step) typically includes the oligomer and 5 wt-% or more (or 10 wt-% or more) of a nonreactive carrier.

For polyesters derived from ethylene glycol, reaction temperatures of 210-235° C. are recommended. The esterification reaction conveniently may be performed at atmospheric or elevated pressure, for example, at gauge pressures of at least 34 kilopascals (KPa) (5 pounds per square inch (psi)), and often up to 100 KPa (15 psi), up to 200 KPa (29 psi), up to 300 KPa (44 psi), up to 400 KPa (58 psi), or up to 500 KPa (73 psi). The use of elevated pressure may provide an increased reaction rate, and the use of elevated pressure together with temperatures lower than those employed in the absence of pressure may limit the number of side reactions. The esterification reaction preferably forms an acid-functional and optionally hydroxyl-functional oligomer having a greater acid number than hydroxyl number.

Unlike typical practice for making solid polyester products, the disclosed esterification reaction may be performed using a carrier whose presence in the intermediate syrup would not be objectionable. Adding a carrier during oligomerization would also make it difficult to use typically employed intrinsic viscosity measurement techniques to monitor the reaction progress. However, by employing a non-viscometric measurement technique (discussed in more detail below) to monitor one or both of the oligomerization and polycondensation reactions, monitoring may be carried out despite the presence of carriers which alter the reaction mixture viscosity.

A variety of carriers may be used, including the nonreactive carriers discussed in more detail below. Fractional distillation may be used to remove water, methanol, and other byproducts from the esterification reactor and to return glycol (and if employed, nonreactive carrier) to the reactor. In a production setting, the esterification reaction may be, for example, carried out in less than 8 hours, less than 7 hours, or less than 6 hours, including time required to heat the reactants but not including time to cool the product. The resulting oligomeric product may immediately be converted to higher molecular weight polyester while still hot, or may be cooled or stored in any convenient fashion as desired and later converted.

The polycondensation reaction may be carried out in a different reactor from the reactor used for esterification, or in the same reactor used to perform esterification. The oligomer is combined with a suitable catalyst and nonreactive carrier at elevated pressure and elevated temperature. Water and glycol are removed via azeotropic reflux with the nonreactive carrier. The resultant intermediate product is a syrup rather than a solid. By avoiding production of a solid at this stage of the process, a wider array of diol reactants may be employed, including higher-boiling diols whose unreacted residuum might otherwise be difficult to remove using vacuum and heat. For example, the disclosed process enables use of diols whose boiling points approach or exceed temperatures at which the polyester product might decompose.

The syrup typically contains appreciable quantities (e.g., 5 wt-% or more) of nonreactive carrier. Adding a carrier would be undesirable in the conventional approach for manufacturing medium or high molecular weight polyester resins, since the added carrier would have to be removed to obtain the normally desired solid end product. Adding a viscosity-reducing carrier during polycondensation would also make it difficult to use intrinsic viscosity measurement techniques to monitor the polymer-forming reaction. However, by employing a non-viscometric measurement technique, monitoring may be carried out despite the presence of carriers which alter the reaction mixture viscosity.

The targeted number average molecular weight for a medium molecular weight polyester may be, for example, 4,000 to 7,000 amu, 5,000 to 7,000 amu, 5,000 to 6,000 amu, or 6,000 to 7,000 amu. The targeted number average molecular weight for a high molecular weight polyester may be, for example, more than 7,000 amu (e.g., at least 7,001 emu), 7,001 to 30,000 amu, 7,001 to 25,000 amu, 7,001 to 20,000 amu, 8,000 to 30,000 amu, 8,000 to 25,000 amu, 8,000 to 20,000 amu, 10,000 to 25,000 amu, 10,000 to 20,000 amu, 10,000 to 18,000 amu, or 10,000 to 16,000 amu.

As noted above, it may be desirable to employ hydroxyl:acid or hydroxyl:ester mole ratios approaching 1:1. Under such circumstances the polymer number average molecular weight can increase rapidly. When forming high molecular weight polyesters or when using viscometric measuring techniques to monitor the reaction progress, and may be all too easy to overshoot the desired reaction endpoint. Alternative monitoring methods such as the use of gel permeation chromatography to determine number average molecular weight, or titrations to determine hydroxyl number may likewise be too time consuming when the polymer-forming reaction is underway. Progression or completion of one or both of the disclosed ester oligomerization and polycondensation reactions preferably employs a non-viscometric monitoring technique. A variety of such techniques may be employed, with the main criteria being rapid availability of measurement results and accuracy as good as or preferably better than the accuracy obtainable using intrinsic viscosity measurements. The use of near-IR analysis to monitor the disappearance of hydroxyl and acid groups is an especially preferred technique. Nuclear magnetic resonance as described in U.S. Pat. No. 6,887,953 (Eng) may also be employed. The measurement results may be used to determine whether additional starting material (e.g., additional diacid or glycol) should be added to the reactor during the ester oligomerization or polycondensation reactions in order to correct the reaction mixture and assist in reaching a targeted number average molecular weight. Non-viscometric techniques may also be combined with viscometric techniques (such as the measurement of intrinsic viscosity or the monitoring of stirrer torque) to monitor the ester oligomerization and polycondensation reactions (e.g., conversion of oligomer to polymer)

The polyester polymer may be formulated to obtain targeted properties other than molecular weight, or to obtain properties at a given number average molecular weight that are not available in commercially supplied polyester polymers. For example, a polyester polymer of the present disclosure may have a glass transition temperature (Tg) of greater than 20° C., greater than 25° C., greater than 30° C., greater than 40° C., or greater than 50° C. A polyester polymer of the present disclosure may have a Tg of up to 70° C., up to 65° C., up to 60° C., up to 55° C., up to 40° C., or up to 35° C.

One preferred subclass of polyester polymers has a Tg greater than 25° C. and up to 65° C. For example, the Tg may be chosen so as to provide a polyester polymer that is non-tacky at room temperature, but which is sufficiently flexible so that a coating made using the polymer resists cracking or crazing when bent.

Another preferred subclass of polyester polymers contains linear polyester polymers with a polymer backbone being free of or substantially free of ethylene oxide or propylene oxide groups.

Yet another preferred subclass of polyester polymers is derived from at least some aromatic dicarboxylic acid, anhydride, or ester.

A variety of catalysts may be employed in the polycondensation reaction and will be familiar to persons having ordinary skill in the art. Exemplary catalysts include, but are not limited to, those mentioned above in connection with the esterification reaction, used in amounts sufficient to promote the polycondensation reaction, for example, 5 ppm to 10,000 ppm catalyst based on the polyester weight.

A variety of nonreactive carriers may be employed. Representative nonreactive carriers include, but are not limited to, hydrocarbons, fluorocarbons, ketones, and mixtures thereof. The chosen nonreactive carrier may be selected based on a variety of parameters including its azeotropic boiling point characteristics when mixed with water, any contemplated later processing steps or storage considerations, or volatile organic compound (VOC) considerations. The nonreactive carrier may have, for example, a boiling point greater than the highest expected temperature at which the polyester syrup may be stored (e.g., at least 60° C.) up to temperatures as high as or even exceeding temperatures at which the polyester product might decompose (e.g., up to or in excess of 250° C., up to or in excess of 260° C., up to or in excess of 275° C., or up to or in excess of 300° C.). In certain embodiments, the nonreactive carrier may have a boiling point of at least 60° C., at least 140° C., at least 150° C., or at least 175° C. In certain embodiments, the nonreactive carrier may have a boiling point of up to 300° C. In certain embodiments, the nonreactive carrier may have a boiling point of 60° C. to 300° C., 140° C. to 300° C., 150° C. to 300° C., or 175° C. to 300° C. Preferably, the nonreactive carrier has a boiling point greater than or equal to that of the aromatic solvent used (e.g., xylenes (140° C.), toluene (111° C.), aromatic 100 (100° C.), aromatic 150 (150° C.)).

Exemplary nonreactive carriers include alkanes such as heptane (B.P. 98° C.), octane (B.P. 126° C.), mineral spirits (B.P. 140-300° C.) and mixtures thereof, aromatic hydrocarbons including toluene (B.P. 110° C.), xylene (B.P. 140° C.), ligroin (B.P. 60-90° C.), commercially available materials such as the "AROMATIC" series fluids (e.g., AROMATIC 150 and AROMATIC 200) from ExxonMobil Corp. and the SHELLSOL series fluids (e.g., SHELLSOL A100 and SHELLSOL A150) from Shell Chemical Co, and mixtures thereof, petroleum solvents including petroleum naphtha, VM&P naphtha, Stoddard solvent, kerosene (B.P. 150° C.) and mixtures thereof, plant-derived solvents including turpentine (B.P. 150-180° C.); ketones including methyl ethyl ketone (B.P. 80° C.), methyl isobutyl ketone (B.P. 117°

C.), methyl isoamyl ketone (B.P. 144° C.), methyl amyl ketone (B.P. 150° C.), cyclohexanone (B.P. 156° C.), isobutyl ketone (B.P. 168° C.), methyl hexyl ketone (B.P. 173° C.), methyl heptyl ketone (B.P. 192° C.) and mixtures thereof, and mixtures of different such classes of nonreactive carriers. Aromatic hydrocarbons are preferred nonreactive carriers. Sufficient nonreactive carrier should be employed to provide a stirrable reaction mixture and to provide an intermediate product in the form of a polyester syrup.

The nonreactive carrier may be used in a relatively high proportion (e.g., in amounts corresponding to 5 wt-% or more, 10 wt-% or more, 15 wt-% or more, 20 wt-% or more, 30 wt-% or more, 40 wt-% or more, or 50 wt-% or more, of the intermediate polyester syrup weight). The nonreactive carrier may be, for example, up to 95 wt-%, up to 90 wt-%, up to 85 wt-%, up to 80 wt-%, up to 70 wt-%, up to 60 wt-%, or up to 50 wt-%, of the polyester syrup weight. Large amounts of nonreactive carrier generally help increase the polycondensation reaction rate, shorten the polycondensation reaction cycle time, or reduce the required stirring torque.

The polycondensation reaction may be performed at any convenient elevated temperature (above 120° C.) so long as the polymer forms at a suitable rate and does not undesirably degrade. The polycondensation reaction temperature may be, for example, at least 200° C., at least 215° C., or at least 225° C. (as determined by measuring the temperature of the reactants themselves rather than the headspace above the reactants). The polycondensation reaction temperature may be, for example, up to 260° C., up to 250° C., or up to 235° C. (as determined by measuring the temperature of the reactants themselves rather than the headspace above the reactants).

The polycondensation reaction may be performed at pressures above atmospheric pressure, for example, at gauge pressures of at least 34 KPa (5 psi). The polycondensation reaction may be performed at gauge pressures of up to 100 KPa (15 psi), up to 200 KPa (29 psi), up to 300 KPa (44 psi), up to 400 KPa (58 psi), or up to 500 KPa (73 psi).

Temperatures of 210° C. to 250° C., and more preferably 210° C. to 235° C., and pressures of 200 KPa to 350 KPa, are preferred for polyesters derived from ethylene glycol. In a production setting, the polycondensation reaction may be, for example, carried out in less than 8 hours, less than 7 hours, or less than 6 hours, not counting time to heat the reactants or cool the product. These times are considerably shorter than the times that have been required for conventional solid state polyester polycondensation.

By conducting the polycondensation reaction under pressure rather than under vacuum, the polycondensation reaction rate may increase or the cycle time may shorten. The polycondensation reaction mixture may be stirred, thus further shortening cycle times. The polycondensation reaction may be performed at reduced temperatures compared to a conventional polycondensation reaction, thus limiting the occurrence of side reactions. The use of pressure rather than vacuum during the polycondensation reaction may also reduce overall capital or operating costs, as vacuum reactors can be more expensive to build or more difficult to operate than pressurized reactors. It should be noted, however, that preparation of high molecular weight polyesters using the disclosed process may (in comparison to medium molecular weight polyester preparation) require use of an enlarged polycondensation reaction kettle stirring motor, a longer or higher temperature reaction cycle time, an increased flow of nitrogen or other purging gas through the reactor, quicker measurement of polycondensation reaction progress, or a combination of these measures.

In certain embodiments, after the polycondensation reaction, the process further involves allowing the pressure to rise (or lower) to 100 KPa (15 psi).

The intermediate polyester syrup may contain, for example, 5 wt-% to 95 wt-% polyester solids and 95 wt-% to 5 wt-% nonreactive carrier, with the desired amounts of polyester and nonreactive carrier normally depending somewhat on the polyester number average molecular weight. A medium molecular weight polyester syrup may contain, for example, 40 wt-% to 95 wt-% polyester solids and 60 wt-% to 5 wt-% nonreactive carrier, or 50 wt-% to 80 wt-% polyester solids and 50 wt-% to 20 wt-% nonreactive carrier. A high molecular weight polyester syrup may contain, for example, 5 wt-% to 80 wt-% polyester solids and 95 wt-% to 20 wt-% nonreactive carrier, 10 wt-% to 70 wt-% polyester solids and 90 wt-% to 30 wt-% nonreactive carrier, or 20 wt-% to 60 wt-% polyester solids and 80 wt-% to 40 wt-% nonreactive carrier. If desired, additional carriers (including nonreactive carriers) may be added to the polyester syrup after completion of the polycondensation reaction. For example, reactive carriers (e.g., esters) may be added once the syrup has cooled sufficiently so as to discourage reactions with the polyester; however, in one preferred embodiment the syrup is free of or substantially free of alcohols, glycols, or esters that could react with the polyester at polycondensation temperatures (e.g., at the actual temperature or temperatures at which the polycondensation reaction occurs).

The intermediate syrup is converted to a solid that includes the medium or high molecular weight polyester polymer by applying a vacuum to remove the aromatic solvent from the syrup. The vacuum is typically applied at a level of at least 23 inches of Hg (23.7 kPascals) and often up to 29 inches of Hg (3.3 kPascals). The time required for such conversion from the syrup to the powder is typically at least 1 hour, and typically no more than 3 hours. The temperature for such conversion from the syrup to the powder is typically at least 220° C., and typically no more than 250° C. Then the material is discharged from the vacuum chamber and further cooled to solidify (e.g., on a belt). Once solidified the material undergoes one or more particle reduction steps (e.g., grinding) to form a powder.

This is different from conventional methods of forming medium or high molecular weight solid polyester polymers in at least the following ways: (1) conventional methods call for very high vacuum (e.g., less than 0.1 kPascal) to drive a transesterification reaction through the removal/condensation of a diol, commonly ethylene glycol; and (2) the transesterification reaction is not concerned with stoichiometric ratio of reactants as molecular weight is driven by removal of the diol and monitored by intrinsic viscosity measurements.

In contrast to conventional methods, the azeotropic reflux method of the present disclosure relies on accurate and quick monitoring of stoichiometric ratio of reactants in order to drive the reaction to high molecular weight. This method allows for deviations in the amounts of charging reactants, as well as glycol loss through the distillation column during the reaction. A preferred method of stoichiometric determination uses Fourier Transform Near-Infrared (FT-NIR) Spectrometry. In the method of the present disclosure, because an organic solvent is introduced in the reactor to facilitate azeotropic reflux, a non-solid state viscosity measurement is employed to correlate with molecular weight determination. Dilute solutions of the polymer and a soluble solvent are prepared and Gardner Holdt viscosity measurement is typically used.

The final polyester powder product includes residual (i.e., more than 0 wt-%) aromatic solvent. Typically, this is an amount of less than 1.5 wt-%.

Such polyester powder product may be combined with a variety of one or more additives to form a powder coating composition. Such optional additives include materials that can be added during the extrusion process, but may also be added later. The additives may be added alone or in combination with other additives to provide a desired effect on the powder finish or the powder composition. Such additives can improve the application of the powder coating, the melting and/or curing of that coating, or the performance or appearance of the final coating.

Examples of optional additives that may be useful in the powder include: cure catalysts, pigments, crosslinkers, impact modifiers, antioxidants, color stabilizers, slip and mar additives, UV absorbers, light stabilizers (e.g., hindered amine light stabilizers), conductivity additives, tribocharging additives, anti-corrosion additives, fillers, texture agents, degassing additives, flow control agents, thixotropes, and edge coverage additives. Other additives include performance additives such as rubberizers, friction reducers, and microcapsules. Additionally, the additive could be an abrasive, a heat sensitive catalyst, an agent that helps create a porous final coating, or that improves wetting of the powder. The amounts and types of such additives will be or will become familiar to persons having ordinary skill in the art.

In certain embodiments, the one or more additives include pigments, crosslinkers, fillers, UV absorbers, light stabilizers, and the like. Examples of suitable crosslinkers include epoxy resins, glycidyl functional acrylic resins, triazines (such as triglycidyl isocyanurate (TGIC)), and alkylamides (such as beta hydroxy alkylamide available under the tradename PRIMID from Estron Chemical Inc., Calvert City, KY. In certain embodiments, a crosslinker is used in an amount of at least 3 wt-%, based on the total weight of the powder coating composition. In certain embodiments, a crosslinker is used in an amount of up to 10 wt-%, based on the total weight of the powder.

Products which may be formed from the polyester powders include, but are not limited to, paints and primers (e.g., corrosion-resistant primers containing high molecular weight polyesters), coil coatings, sheet coatings, and packaging coatings.

EXEMPLARY EMBODIMENTS

Embodiment 1 is a process for preparing medium or high molecular weight polyester powder, which process comprises:
  a) providing or forming an ester oligomer;
  b) converting the oligomer to a polyester polymer by stirring at elevated pressure and elevated temperature a reaction mixture comprising the oligomer and a nonreactive carrier capable of forming an azeotrope with water and aromatic solvent (e.g., xylenes, toluene, aromatic 100, aromatic 150);
  c) removing water from the reaction mixture via azeotropic reflux to provide a syrup comprising a medium or high molecular weight polyester polymer in the nonreactive carrier; and
  d) applying a vacuum to remove the aromatic solvent from the syrup and form a solid (which may be in the form of a powder or subsequently formed into a powder) comprising the medium or high molecular weight polyester polymer.

Embodiment 2 is the process of embodiment 1 wherein the polyester polymer has a backbone free of or substantially free of ethylene oxide or propylene oxide groups and the syrup is free of or substantially free of alcohols, glycols, or esters that react with the polymer at polyesters with the polyester polymer.

Embodiment 3 is the process of embodiment 1 or 2 wherein the polyester polymer is a medium molecular weight polymer having a number average molecular weight of 4,000 to 7,000 amu (5,000 to 7,000 amu, 5,000 to 6,000 amu, or 6,000 to 7,000 amu).

Embodiment 4 is the process of any of embodiments 1 or 2 wherein the polyester polymer is a high molecular weight polymer having a number average molecular weight more than 7,000 amu.

Embodiment 5 is the process of embodiment 4 wherein the polyester polymer is a high molecular weight polymer having a number average molecular weight of 7,001 to 30,000 amu, 7,001 to 25,000 amu, 7,001 to 20,000 amu, 8,000 to 30,000 amu, 8,000 to 25,000 amu, 8,000 to 20,000 amu, 10,000 to 25,000 amu, 10,000 to 20,000 amu, 10,000 to 18,000 amu, or 10,000 to 16,000 amu.

Embodiment 6 is the process of any of the preceding embodiments wherein the polymer has a hydroxyl number of 1 to 3.

Embodiment 7 is the process of any of the preceding embodiments wherein the polymer has an acid number of at least 18 (or at least 19, or at least 20).

Embodiment 8 is the process of any of the preceding embodiments wherein the polymer has an acid number of up to 26.

Embodiment 9 is the process of embodiment 7 or 8 wherein the polymer has an acid number of 20 to 26.

Embodiment 10 is the process of any of the preceding embodiments wherein the reaction mixture (of the converting step) comprises the oligomer and 5 wt-% or more (or 10 wt-% or more) of the nonreactive carrier.

Embodiment 11 is the process of any of the preceding embodiments wherein the syrup comprises the polymer and 5 wt-% or more (or 10 wt-% or more) of the nonreactive carrier.

Embodiment 12 is the process of any of the preceding embodiments wherein the nonreactive carrier has a boiling point greater than or equal to that of the aromatic solvent.

Embodiment 13 is the process of embodiment 12 wherein the nonreactive carrier has a boiling point of at least 140° C. (or at least 150° C.).

Embodiment 14 is the process of embodiment 12 or 13 wherein the nonreactive carrier has a boiling point of up to 300° C.

Embodiment 15 is the process of any of the preceding embodiments wherein the nonreactive carrier comprises an alkane, aromatic hydrocarbon, petroleum solvent, plant-derived solvent, ketone, or mixture thereof.

Embodiment 16 is the process of any of the preceding embodiments wherein converting the oligomer to a polyester polymer comprises stirring at a gauge pressure of at least 34 KPa.

Embodiment 17 is the process of any of the preceding embodiments wherein converting the oligomer to a polyester polymer comprises stirring at a gauge pressure of up to 500 KPa (up to 400 KPa, up to 300 KPa, up to 200 KPa, or up to 100 KPa).

Embodiment 18 is the process of any of the preceding embodiments wherein converting the oligomer to a polyester polymer comprises stirring at a temperature of at least 200° C. (at least 215° C., or at least 225° C.).

Embodiment 19 is the process of any of the preceding embodiments wherein converting the oligomer to a polyester polymer comprises stirring at a temperature of up to 260° C. (up to 250° C., or up to 235° C.).

Embodiment 20 is the process of any of the preceding embodiments further comprising a step of allowing the pressure to rise to 100 kPa after converting the oligomer to a polyester polymer.

Embodiment 21 is the process of any of the preceding embodiments wherein providing or forming an ester oligomer comprises forming an ester oligomer in an esterification step.

Embodiment 22 is the process of embodiment 21 wherein the ester oligomer is formed from at least one glycol having a boiling point greater than 196° C. (or greater than 200° C., or greater than 204° C.).

Embodiment 23 is the process of embodiment 22 wherein the ester oligomer is formed from more than one glycol, wherein each glycol has a boiling point greater than 196° C. (or greater than 200° C., or greater than 204° C.).

Embodiment 24 is the process of any of embodiments 21 to 23 wherein forming an ester oligomer in an esterification step comprises providing an esterification reaction mixture (e.g., reactants, oligomer, and/or polymer) having an hydroxyl:acid or hydroxyl:ester ratio of at least 0.5:1 (at least 0.8:1, at least 0.9:1, at least 0.95:1, at least 0.98:1, or at least 1:1).

Embodiment 25 is the process of any of embodiments 21 to 24 wherein forming an ester oligomer in an esterification step comprises providing an esterification reaction mixture (e.g., reactants, oligomer, and/or polymer) having an hydroxyl:acid or hydroxyl:ester ratio of up to 2:1 (up to 1.5:1, up to 1.2:1, up to 1.1:1, up to 1.05:1, or up to 1.02:1).

Embodiment 26 is the process of any of embodiments 21 to 25 wherein forming an ester oligomer occurs in the nonreactive carrier.

Embodiment 27 is the process of any of embodiments 21 or 26 wherein forming an ester oligomer in an esterification step occurs substantially without ethylene glycol or propylene glycol.

Embodiment 28 is the process of any of embodiments 21 to 27 wherein near-IR analysis is used to monitor the disappearance of hydroxyl and acid groups.

Embodiment 29 is the process of any of the preceding embodiments further comprising using a non-viscometric technique to monitor the conversion of oligomer to polymer.

Embodiment 30 is the process of any of the preceding embodiments wherein the polyester polymer comprises hydroxyl functionality, carboxylic acid functionality, or a combination thereof.

Embodiment 31 is the process of embodiment 30 wherein the polyester polymer comprises carboxylic acid functionality.

Embodiment 32 is the process of embodiment 30 or 31 wherein the polyester polymer has an acid number of 20 to 26, and a hydroxyl number of 1 to 3.

Embodiment 33 is the process of any of the previous embodiments wherein an hydroxyl functional polymer is initially formed and reacted with an anyhydride in a ring opening reaction to form carboxylic acid functionality.

Embodiment 34 is the process of embodiment 33 wherein the reaction with the anhydride is carried out at a temperature of 130° C. to 170° C.

Embodiment 35 is the process of any of the preceding embodiments wherein applying a vacuum to remove the aromatic solvent from the syrup and form a solid comprises applying a vacuum of at least 23 inches of Hg (23.7 kPas).

Embodiment 36 is the process of any of the preceding embodiments wherein applying a vacuum to remove the aromatic solvent from the syrup and form a solid comprises applying a vacuum of up to 29 inches of Hg (3.3 kPas).

Embodiment 37 is the process of any of the preceding embodiments wherein applying a vacuum to remove the aromatic solvent from the syrup and form a solid comprises applying a vacuum for at least 1 hour.

Embodiment 38 is the process of any of the preceding embodiments wherein applying a vacuum to remove the aromatic solvent from the syrup and form a solid comprises applying a vacuum for no more than 3 hours.

Embodiment 39 is the process of any of the preceding embodiments wherein applying a vacuum to remove the aromatic solvent from the syrup and form a solid comprises applying a vacuum at a temperature of at least 220° C.

Embodiment 40 is the process of any of the preceding embodiments wherein applying a vacuum to remove the aromatic solvent from the syrup and form a solid comprises applying a vacuum at a temperature of no more than 250° C.

Embodiment 41 is the process of any of the preceding embodiments wherein applying a vacuum to remove the aromatic solvent from the syrup and form a solid further comprises applying one or more particle reduction steps (e.g., grinding) to form a powder.

Embodiment 42 is the process of any of the preceding embodiments wherein the polyester polymer has a Tg of greater than 20° C. (or greater than 25° C., greater than 30° C., greater than 40° C., or greater than 50° C.).

Embodiment 43 is the process of any of the preceding embodiments wherein the polyester polymer has a Tg of up to 70° C. (or up to 65° C., up to 60° C., up to 55° C., up to 40° C., or up to 35° C.).

Embodiment 44 is a polyester polymer powder formed by the process of any of the preceding embodiments.

Embodiment 45 is the polyester polymer powder of embodiment 44 comprising residual aromatic solvent.

Embodiment 46 is the polyester polymer powder of embodiment 45 comprising less than 1.5 wt-% aromatic solvent.

Embodiment 47 is a powder coating composition comprising the polyester polymer powder of any of embodiments 44 to 46 and one or more additives.

Embodiment 48 is the powder coating composition of embodiment 47 wherein the one or more additives comprise pigments, crosslinkers, fillers, UV absorbers, light stabilizers, and the like.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods. The following abbreviations may be used in the following examples: ppm=parts per million; phr=parts per hundred rubber; mL=milliliter; L=liter; m=meter, mm=millimeter, cm=centimeter, kg=kilogram, g=gram, min=minute, s=second, h=hour, ° C.=degrees Celsius, ° F.=degrees Farenheit, MPa=megapascals, and N-m=Newton-meter, Mn=number average molecular weight, cP=centipoise.

Test Methods

Impact Resistance

The direct and reverse impact resistance of cured coatings prepared from the powder compositions is tested using the method described in ASTM D2794 (Standard Test Method for Resistance of Organic Coatings to the Effects of Rapid Deformation). In certain embodiments, the direct impact resistance of a cured coating ranges from 60 in-lbs to 160 in-lbs, and preferably 100 in-lbs to 160 in-lbs. In certain embodiments, the reverse impact resistance of a cured coating ranges from 20 in-lbs to 160 in-lbs, preferably 60 in-lbs to 160 in-lbs, and more preferably 100 in-lbs to 160 in-lbs.

Flexibility

The flexibility of cured coatings prepared from the powder compositions is tested using the Mandrel Bend Test, as described in ASTM D522 (Standard Test Methods for Mandrel Bend Test for Attached Organic Coatings). In certain embodiments, a cured coating demonstrates a desirable flexibility as evidenced by no cracking at 3/8 inch and 1/8 inch using the Mandrel Bend Test.

Solvent Resistance

The solvent resistance of cured coatings prepared from the powder compositions is tested using the method described in ASTM D4752 (Standard Test Methods for Measuring MEK Resistance). The results are rated visually on a scale of 1 to 5, where 1 represents complete failure (i.e., the solvent penetrates down to the substrate after 100 double rubs) and 5 represents no effect (i.e., the solvent produces no visually detectable effect on the coating after 100 double rubs). In certain embodiments, the solvent produces no visually detectable effect on the coating after 25 double rubs. In certain embodiments, the solvent produces no visually detectable effect on the coating after 100 double rubs. In certain embodiments, the visual rating is at least 3, at least 4, or at least 5.

Stability Rating

A small sample of finished powder is placed in an oven which is maintained at a temperature of 110° F. (43° C.), and examined after 24 hours. The powder compositions are rated for physical stability on a scale of 1 (small blocks, easy to break into free flowing powder) to 5 (one large block, very difficult to break). In certain embodiments, the physical stability of the finished powder is no more than 3, no more than 2, or no more than 1.

Gloss

The gloss or surface smoothness of cured coatings prepared from the powder compositions is tested as 20-degree gloss and 60-degree gloss, using the method described in ASTM D523 (Standard Test Method for Specular Gloss). In certain embodiments, the 20-degree gloss is at least 20. In certain embodiments, the 20-degree gloss is up to 50. In certain embodiments, the 60-degree gloss is at least 40. In certain embodiments, the 60-degree gloss is up to 90.

Gel Time

The gel time of the finished powder is measured as described in ASTM D42 17 (Standard Test Method for Gel Time of Thermosetting Coating Powders), at 200° C. In certain embodiments, the gel time is desirably no more than 200 seconds, no more than 150 seconds, or no more than 120 seconds. In certain embodiments, the gel time is at least 90 seconds, or at least 110 seconds.

Preparation of Polyester Polymer Powders

Example 1: OH Functional Polyester+Phthalic Anhydride Capping (Xylene Reflux)

Samples of 5.7 moles of neopentyl glycol (NPG, available from Perstorp Polyols Inc., Toledo, Ohio), 3.65 moles of terephthalic acid (TPA, available from Flint Hills Resources, Wichita, Kansas), 0.1 part by weight butyl stannoic acid (available from Brenntag North America, Reading, PA) were charged to a 3.0 liter flask equipped with an agitator, packed column, condenser, thermometer, and inert gas inlet. The reactor was flushed with inert gas and the reactants heated to 235° C. over 5.5 hours while removing water. The reaction was held for an acid number of 3.0. The temperature was reduced to 180° C. and 1.80 moles isophthalic acid (IPA, available from Eastman Chemical Company, Kingsport, TN) was charged to the reactor. The reactants were heated to 235° C. while removing water. After the reaction mixture was clear, azeotropic distillation was started using an aromatic hydrocarbon fraction: xylene with kettle % NVM=97.0%. The reaction was held for acid number<2.0. The packed column was removed and replaced with a Dean Stark trap. The pressure of the vessel was reduced by applying 100 mm Hg vacuum, thereby facilitating the removal of xylene. The temperature of the mixture was reduced to 200° C. and 0.4 mole of phthalic anhydride was added to the reactor. The contents were held at 200° C. for one hour and then discharged onto an aluminum pan. Once completely cooled, the solid resin was chopped into finer particles.

The final acid number of the solid resin (in powder form) was 18.6; the OH number was 9.7; the number average molecular weight (Mn)=5,578 and the weight average molecular weight (Mw)=8,579 as measured by GPC; Tg=51.0° C. as measured by DSC; free xylene=0.5% as measured by GC; Gardner Color=1 (as measured in 50% NVM solution in cyclohexanone).

Example 2 (Comparative): COOH Functional Polyester (Ketone Reflux)

Samples of 6.2 moles of NPG, 4.3 moles of TPA, 0.1 part by weight butyl stannoic acid were charged to a 3.0 liter flask equipped with an agitator, packed column, condenser, thermometer, and inert gas inlet. The reactor was flushed with inert gas and the reactants heated to 235° C. over 5.5 hours while removing water. The reaction was held for an acid number of 3.0. The temperature was reduced to 180° C. and 2.1 moles IPA was charged to the reactor. The reactants were heated to 235° C. while removing water. After the reaction mixture was clear, azeotropic distillation was started using a ketone hydrocarbon fraction: methyl amyl ketone with kettle % NVM=97.0%. The reaction was held for acid number=23.0. The packed column was removed and replaced with a Dean Stark trap. The pressure of the vessel was reduced by applying 100 mm Hg vacuum, thereby facilitating the removal of methyl amyl ketone. The contents were cooled to 200° C. and then discharged onto an aluminum pan. Once completely cooled, the solid resin was chopped into finer particles.

The final acid number of the solid resin was 24.0; the OH number was 1.0; the number average molecular weight (Mn)=4517 and the weight average molecular weight (Mw)=7598 as measured by GPC; Tg=58.8° C. as measured by DSC; free methyl amyl ketone=0.5% as measured by GC; Gardner Color=5 (as measured in 50% NVM solution in cyclohexanone). This solid resin was poor in color (very yellow) and possessed an objectionable odor.

Example 3: COOH Functional Polyester (Xylene Reflux)

Samples of 7.2 moles of NPG, 5.6 moles of TPA, 0.1 part by weight butyl stannoic acid were charged to a 3.0 liter flask equipped with an agitator, packed column, condenser, thermometer, and inert gas inlet. The reactor was flushed with inert gas and the reactants heated to 235° C. over 5.5 hours while removing water. The reaction was held for an acid number of 3.0. The temperature was reduced to 180° C. and 1.9 moles IPA was charged to the reactor. The reactants were heated to 235° C. while removing water. After the reaction mixture was clear, azeotropic distillation was started using an aromatic hydrocarbon fraction: xylene with kettle % NVM=97.0%. The reaction was held for acid number=25.0. The packed column was removed and replaced with a Dean Stark trap. The pressure of the vessel was reduced by applying 100 mm Hg vacuum, thereby facilitating the removal of xylene. The contents were cooled to 200° C. and then discharged onto an aluminum pan. Once completely cooled, the solid resin was chopped into finer particles.

The final acid number of the solid resin was 25.1; the OH number was 1.0; the number average molecular weight (Mn)=5040 and the weight average molecular weight (Mw)=7870 as measured by GPC; Tg=60.1° C. as measured by DSC; free xylene=0.5% as measured by GC; Gardner Color=1 (as measured in 50% NVM solution in cyclohexanone). This solid resin, when crosslinked with beta hydroxy alkylamide available under the tradename PRIMID (available from Estron Chemical Inc., Calvert City, KY) exhibited excellent physical properties (see Table 2).

Preparation of Powder Coating Formulations and Properties

Solid polyester resin samples (Examples 1-3) were ground into powder and then powder coatings were made by premixing a polyester powder along with other ingredients in the amounts shown in Table 1 below, with the exception that the aluminum oxide was added at the final grinding step. The premix was extruded on an extruder (Werner-Pfleiderrer ZSK-30) at 300 revolutions per minute (rpm) and temperature set points of 70° C. (zone 1) and 120° C. (zone 2). The extruded solid was then treated with the aluminum oxide as shown in the table, and milled using a Retsch ZM 200 with a 0.5 mm screen, then sieved through a 140 US Standard Mesh Screen. The powder compositions were sprayed on to test panels by electrostatic spray methods and cured by heating for 10 minutes at 204° C. The powders and panels were evaluated for various physical properties, and results are shown in Table 2.

TABLE 1

Powder Coating Formulations

| Example | Ex. 1 | Ex 2 | Ex 3 | Ex 4 |
|---|---|---|---|---|
| Resin (Example 1) | 72.5 | | | |
| Resin (Example 2) | | 72.5 | | |
| Resin (Example 3) | | | 72.5 | |
| URALAC P834 high vacuum resin (STD) available from DSM Inc. | | | | 72.5 |
| PRIMID Beta hydroxy alkylamide crosslinker available from Estron Chemical Inc. | 2.4 | 2.4 | 2.4 | 2.4 |
| RESIFLOW PL-200 acrylic flow control agent (33% silica carrier) available from Estron Chemical Inc. | 1.0 | 1.0 | 1.0 | 1.0 |
| Benzoin | 0.3 | 0.3 | 0.3 | 0.3 |
| Titanium Dioxide | 0.22 | 0.22 | 0.22 | 0.22 |
| Iron Oxide Yellow | 3.03 | 3.03 | 3.03 | 3.03 |
| Iron Oxide Red | 0.56 | 0.56 | 0.56 | 0.56 |
| Carbon Black | 0.19 | 0.19 | 0.19 | 0.19 |
| Barium Sulfate | 18.9 | 18.9 | 18.9 | 18.9 |
| Polyethylene Wax | 0.5 | 0.5 | 0.5 | 0.5 |
| TINUVIN 144 hindered amine light stabilizer available from BASF | 0.2 | 0.2 | 0.2 | 0.2 |
| Aluminum Oxide | 0.2 | 0.2 | 0.2 | 0.2 |
| Total | 100.0 | 100.0 | 100.0 | 100.0 |

TABLE 2

Comparison of Physical Properties of Powder Coatings

| Property | Ex. 1 | Ex. 2 | Ex. 3 | Ex. 4 |
|---|---|---|---|---|
| Mandrel Bend | No cracking | No cracking | No cracking | No cracking |
| Impact (Dir/Rev: in-lbs) | 60/20 | 160/60 | 160/160 | 160/160 |
| Gel Time (200° C.-seconds) | 200 | 118 | 112 | 112 |
| Gloss (60°/20°) | 76.8/38.4 | 82.8/48.7 | 80.5/47.8 | 79.7/43.7 |
| MEK Resistance | 3 | 5 | 5 | 5 |
| Stability Rating | 1 | 1 | 1 | 1 |

The solid polyester resin of Example 1, which has hydroxyl and carboxylic acid functionality, could provide a powder coating with higher MEK Resistance if a different crosslinker were used. Examples of such crosslinkers include epoxy resin, glycidyl functional acrylic resins, and triazines (such as triglycidyl isocyanurate (TGIC)).

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A process for preparing a polyester polymer powder comprising a medium molecular weight polyester polymer having a number average molecular weight of 4,000 amu to 7,000 amu or a high molecular weight polyester polymer having a number average molecular weight greater than 7,000 amu, which process comprises:
- a) providing or forming an ester oligomer that has a greater acid number than hydroxyl number;
- b) converting the oligomer to the polyester polymer by stirring at an elevated temperature a reaction mixture comprising the oligomer and a nonreactive carrier comprising an aromatic hydrocarbon, wherein the elevated temperature is at least 200° C.;
- c) removing water from the reaction mixture via azeotropic reflux to provide a syrup comprising a medium or high molecular weight polyester polymer in the nonreactive carrier; and
- d) applying a vacuum to form a solid in the form of a powder comprising the medium or high molecular weight polyester polymer;

wherein the polyester polymer has an acid number of at least 17 and up to 26.

2. The process of claim 1 wherein the polyester polymer has a backbone free of or substantially free of ethylene oxide or propylene oxide groups and the syrup is free of or substantially free of alcohols, glycols, or esters that react at polycondensation temperatures with the polyester polymer.

3. The process of claim 1 wherein the polyester polymer is a medium molecular weight polymer having a number average molecular weight of 4,000 to 7,000 amu.

4. The process of claim 1 wherein the polyester polymer is a high molecular weight polymer having a number average molecular weight of more than 7,000 amu.

5. The process of claim 1 wherein the polymer has an acid number of 20 to 26.

6. The process of claim 1 wherein the nonreactive carrier comprises a mixture of solvents.

7. The process of claim 1 wherein converting the oligomer to a polyester polymer comprises stirring at a gauge pressure of at least 34 KPa and up to 500 KPa.

8. The process of claim 1 further comprising a step of allowing the pressure to rise to 100 kPa after converting the oligomer to a polyester polymer.

9. The process of claim 1 wherein providing or forming an ester oligomer comprises forming an ester oligomer in an esterification step.

10. The process of claim 9 wherein the ester oligomer is formed from at least one glycol having a boiling point greater than 196° C.

11. The process of claim 9 wherein forming an ester oligomer in an esterification step comprises providing an esterification reaction mixture having a hydroxyl:acid or hydroxyl:ester ratio of at least 0.5:1 and up to 2:1.

12. The process of claim 1 wherein the polyester polymer comprises hydroxyl functionality, carboxylic acid functionality, or a combination thereof.

13. The process of claim 1 wherein converting the oligomer to a polyester polymer comprises stirring at elevated pressure.

14. The process of claim 1 wherein converting the oligomer to a polyester polymer comprises stirring at atmospheric pressure.

15. The process of claim 1 wherein the polymer has a glass transition temperature (Tg) of greater than 20° C. and up to 70° C.

16. A process for preparing a polyester polymer powder comprising a medium molecular weight polyester polymer having a number average molecular weight of 4,000 amu to 7,000 amu or a high molecular weight polyester polymer having a number average molecular weight greater than 7,000 amu, which process comprises:
- a) providing or forming an ester oligomer;
- b) converting the oligomer to the polyester polymer by stirring at an elevated temperature a reaction mixture comprising the oligomer and a nonreactive carrier comprising an aromatic hydrocarbon, wherein the elevated temperature is at least 200° C.;
- c) removing water from the reaction mixture via azeotropic reflux to provide a syrup comprising a medium or high molecular weight polyester polymer in the nonreactive carrier; and
- d) applying a vacuum to form a solid in the form of a powder comprising the medium or high molecular weight polyester polymer;

wherein the polymer has a hydroxyl number of 1 to 3 and an acid number of 20 to 26.

17. The process of claim 16 wherein the polymer has a glass transition temperature (Tg) of greater than 20° C. and up to 70° C.

18. A process for preparing a polyester polymer powder comprising a medium molecular weight polyester polymer having a number average molecular weight of 4,000 amu to 7,000 amu or a high molecular weight polyester polymer having a number average molecular weight greater than 7,000 amu, which process comprises:
- a) providing or forming an ester oligomer that has a greater acid number than hydroxyl number;
- b) converting the oligomer to the polyester polymer by stirring at an elevated temperature a reaction mixture comprising the oligomer and xylene, wherein the elevated temperature is at least 200° C.;
- c) removing water from the reaction mixture via azeotropic reflux to provide a syrup comprising a medium or high molecular weight polyester polymer in xylene; and
- d) applying a vacuum to form a solid in the form of a powder comprising the medium or high molecular weight polyester polymer;

wherein the polyester polymer has an acid number of at least 17 and up to 26.

* * * * *